United States Patent [19]
Bock et al.

[11] 3,987,045
[45] Oct. 19, 1976

[54] DISPERSE DYES BASED ON ISOINDOLENE DERIVATIVES

[75] Inventors: Gustav Bock, Neustadt; Wolfgang Elser, Frankenthal, both of Germany

[73] Assignee: BASF Aktiengesellschaft, Ludwigshafen (Rhine), Germany

[22] Filed: Aug. 27, 1975

[21] Appl. No.: 608,388

Related U.S. Application Data

[60] Division of Ser. No. 448,947, March 7, 1974, Pat. No. 3,923,806, which is a continuation-in-part of Ser. No. 247,820, April 26, 1972, abandoned.

[30] Foreign Application Priority Data

May 3, 1971  Germany............................ 2121524

[52] U.S. Cl................................. 260/256.4 C; 8/10; 260/302 F; 260/309.2; 260/310 R; 260/326.1; 260/257
[51] Int. Cl.².................................... C07D 239/62
[58] Field of Search............................. 260/256.4 C

[56] References Cited
FOREIGN PATENTS OR APPLICATIONS
1,537,299  9/1967  France........................ 260/256.4 C Primary Examiner—Nicholas S. Rizzo
Assistant Examiner—James H. Turnipseed
Attorney, Agent, or Firm—Johnston, Keil, Thompson & Shurtleff

[57] ABSTRACT

Disperse dyes of the formula:

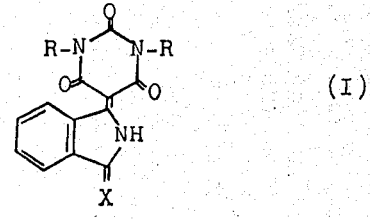

in which both R's are alkyl, phenyl or phenalkyl (the radical R bearing other substituents if desired) and X is the radical of a methyleneactive compound. The dyes dye fibers of linear polyesters brilliant greenish yellow to bluish red shades.

3 Claims, No Drawings

DISPERSE DYES BASED ON ISOINDOLENE DERIVATIVES

RELATED APPLICATION

This is a division of application Ser. No. 448,947, filed Mar. 7, 1974, now U.S. Pat. No. 3,923,806, which is in turn a continuation-in-part of our copending application Ser. No. 247,820, filed Apr. 26, 1972 now abandoned, the disclosure of which is incorporated herein by reference.

The invention relates to new disperse dyes based on 3-iminoisoindoline derivatives.

The invention relates to disperse dyes of the formula:

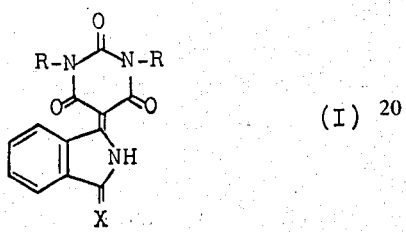

(I)

in which both R's are alkyl of one to five carbon atoms in which one or more hydrogen atoms may be replaced by chlorine, bromine, alkoxy of one to four carbon atoms, aryloxy, cyano, alkoxycarbonyl or acyloxy of a total of two to five carbon atoms, or phenyl which may bear chlorine, bromine, alkyl or alkoxy of one or two carbon atoms as substituent, or phenalkyl which may bear chlorine, bromine, alkyl or alkoxy of one or two carbon atoms as substituent in the phenyl radical, and in which the two R's may be identical or different and X is:

The new dyes dye linear aromatic polyester fibrous material brilliant greenish yellow to bluish red shades by the carrier and HT methods. The dyeings obtained on polyesters have very good tinctorial properties such as good fastness to light.

Examples of alkyl and substituted alkyl for R are: methyl, ethyl, n-propyl, isopropyl, n-butyl, isobutyl, amyl, isoamyl, 2-methoxyethyl, 2-ethoxyethyl, 2-n-propoxyethyl, 2-isopropoxyethyl, 2-n-butoxyethyl, 2-isobutoxyethyl, 3-methoxypropyl, 3-ethoxypropyl, 3-n-propoxypropyl, 3-isopropoxypropyl, 2-chloroethyl, 2-bromoethyl, 2-cyanoethyl, 2-carbomethoxyethyl, 2-carboethoxyethyl, 2-carbopropoxyethyl and 2-carbobutoxyethyl.

Examples of substituted phenyl or aralkyl are: 2-chlorophenyl, 3-chlorophenyl, 4-chlorophenyl, 2-bromophenyl, 3-bromophenyl, 4-bromophenyl, 2-methylphenyl, 3-methylphenyl, 4-methylphenyl, 2-ethylphenyl, 3-ethylphenyl, 4-ethylphenyl, 2-n-butylphenyl, 3-n-butylphenyl, 4-n-butylphenyl, 2tert.-butylphenyl, 3-tert.-butylphenyl, 4-tert.-butylphenyl, 2-methoxyphenyl, 3-methoxyphenyl, 4-methoxyphenyl, 4-ethoxyphenyl, benzyl and βphenylethyl.

Methyl, 2-chloroethyl, 2-methoxyethyl, 3-methoxypropyl, 3-ethoxypropyl, 3-isopropoxypropyl and 2-cyanoethyl are particularly preferred as substituents of R.

The new dyes are obtained, by a method known per se, by condensation of a monosubstitution product of 3-iminoisoindoline of the general formula

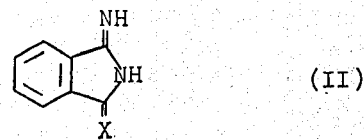

(II)

in which X has the above meanings with a derivative of barbituric acid of the general formula

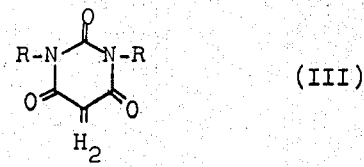

(III)

in which R has the above meanings in a solvent or diluent at elevated temperature.

The monosubstitution products of 3-iminoisoindoline of the general formula (II) are obtained by a conventional method by reaction of 3-imino-1-aminoisoindoline with 4-nitrobenzyl cyanide in a solvent or diluent.

Barbituric acid derivatives of the general formula (III) include N-(2-chloroethyl)-N'-(3-methoxypropyl)-barbituric acid, N,N'-bis-(3-ethoxypropyl)-barbituric acid, N,N'-dimethylbarbituric acid, N-methyl-N'-(3-methoxypropyl)-barbituric acid, N,N'-bis-(3-methoxypropyl)-barbituric acid, N-methyl-N'-(3-ethoxypropyl)-barbituric acid, N-methyl-N'-(3-propoxypropyl)-barbituric acid, N-ethyl-N'-(3-ethoxypropyl)-barbituric acid, N-ethyl-N'-(3-methoxypropylbarbituric acid, N-benzyl-N'-(3-methoxypropyl)-barbituric acid, N-methyl-N'-(2-methoxyethyl)-barbituric acid, N-ethyl-N'-(2-methoxyethyl)-barbituric acid and bis-(2-methoxyethyl)-barbituric acid.

Suitable solvents and diluents include polar organic solvents, especially those which are miscible in all proportions with water such as dimethylformamide, diethylformamide, diethylacetamide, dimethylacetamide, N-methylpyrrolidone, glacial acetic acid, formic acid, glycol monomethyl ether, glycol monoethyl ether or mixtures of the same. Mixtures of dimethylformamide and glacial acetic acid are particularly suitable as solvents or diluents. Condensation is advantageously carried out at a temperature within the range from 50° to 130° C.

The monosubstitution product (II) is heated with the barbituric acid derivative (III) in the solvent or diluent to effect condensation. After the reaction is over the dye may be precipitated, depending on its solubility in the reaction medium, for example by pouring the reaction mixture into water followed by suction filtration or isolated by direct suction filtration of the reaction mixture.

Mixtures of dyes consisting of two or more dyes may be prepared (instead of individual dyes)

a. by reacting a mixture of monosubstitution products of 3-iminoisoindoline (II) with a barbituric acid derivative (III), or b. by reacting a single monosubstitution product of 3-iminoisoindoline (II) with a mixture of barbituric acid derivatives (III), or c. by reacting a mixture of monosubstitution products of 3-iminoisoindolines (II) with a mixture of barbituric acid derivatives (III).

The new dyes, particularly those in which both substituents R are alkyl, aryl and/or phenalkyl, and more particularly those in which both R's are alkyl are outstandingly suitable for dyeing linear aromatic polyester fibrous material from a dye liquor. Dyes in which both nitrogen atoms in the barbituric acid moiety bear hydrogen atoms, such as the dye described in Belgian Pat. No. 703,669 (obtained by reaction of 1-(cyanomethylenecarboxamido)-3-iminoindoline with barbituric acid) are not suitable for dyeing linear aromatic polyester material from a dye liquor because of their sparing solubility.

The following Examples illustrate the invention. The parts and percentages hereinafter given are by weight. The parts by volume specified bear the same relation to parts by weight as the liter to the kilogram.

EXAMPLE 1

15 parts of 1-(cyano-(p-nitrophenyl)-methylene)-3-iminoisoindoline and 10.5 parts of N-phenyl-N'-(3-ethoxypropyl)-barbituric acid are stirred for two hours at 100° C in 100 parts of dimethylformamide and 10 parts of formic acid. After cooling, 15.3 parts of a yellow dye of the formula:

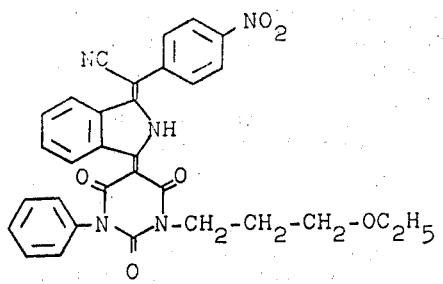

precipitates. The dye dyes aromatic polyester fibrous material green yellow shades of excellent fastness properties.

EXAMPLE 2

29.8 parts of 1-(cyano-(p-nitrophenylmethylene)-3-iminoisoindoline and 60 parts of a 1:2:1 mixture of N,N'-dimethylbarbituric acid, N-methyl-N'-(3-ethoxypropyl)-barbituric acid and N,N'-bis-(3-ethoxypropyl)-barbituric acid are stirred for 90 minutes at 100° C in 100 parts of dimethylformamide. After 1000 parts of methanol has been added, 30.5 parts of a yellow dye precipitates being a mixture of three dyes.

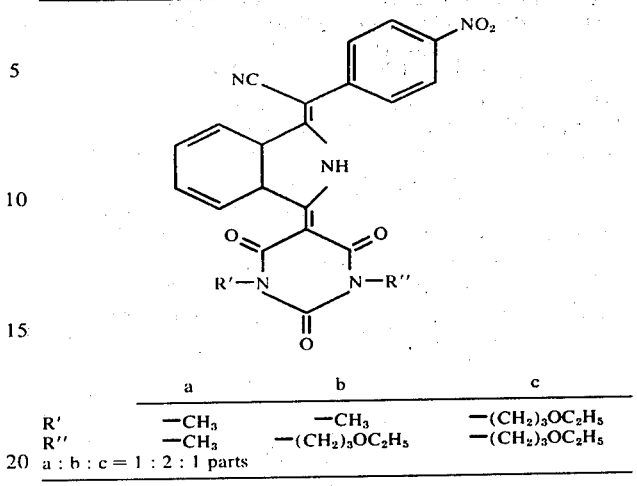

|  | a | b | c |
|---|---|---|---|
| R' | —CH₃ | —CH₃ | —(CH₂)₃OC₂H₅ |
| R'' | —CH₃ | —(CH₂)₃OC₂H₅ | —(CH₂)₃OC₂H₅ | a : b : c = 1 : 2 : 1 parts

The mixture dyes aromatic polyester fibrous material yellow shades of excellent fastness properties.

EXAMPLES 3 to 12

The N-phenyl-N'-(3-ethoxypropyl)-barbituric acid in Example 1 is replaced by an equivalent amount of barbituric acid derivative of the formula (III) and the procedure of Examples 1 is followed. Dyes of the formula (Ie)

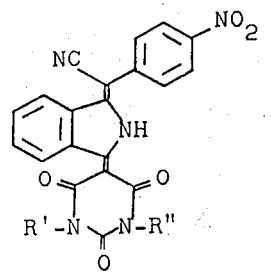

are obtained in which R' and R'' have the meanings specified in the following Table.

| Ex. | R' | R'' | Dyeing on polyester |
|---|---|---|---|
| 3 | —CH₂—CH₂—Cl | —(CH₂)₃—OCH₃ | yellow |
| 4 | —CH₃ | —C₄H₉ | yellow |
| 5 | —C₄H₉ | —(CH₂)₃—OC₂H₅ | yellow |
| 6 | —CH₃ | —CH₃ | yellow |
| 7 | —CH₃ | —(CH₂)₃—OC₂H₅ | yellow |
| 8 | H— | —CH₃ | green yellow |
| 9 | C₆H₅—CH₂— | C₆H₅—CH₂— | yellow |
| 10 | —C₄H₉ | —CH₂—CH₂—C₆H₅ | yellow |
| 11 | —C₂H₅ | —CH₂—CH₂—CN | yellow |
| 12 | —C₄H₉ | —C₄H₉ | yellow |

The invention is hereby claimed as follows:
1. A disperse dye of the formula

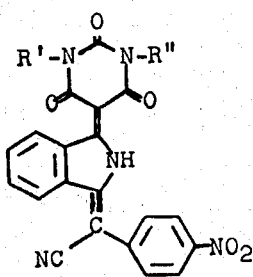

in which R' and R" are alkyl of from 1 to 5 carbon atoms, 2-chloroethyl, 2-cyanoethyl, 2-ethoxyethyl, 2-methoxyethyl, 3-methoxypropyl, 3-ethoxypropyl, 3-isopropoxypropyl, 2-phenylethyl, benzyl or phenyl and wherein R' and R" are identical or different.

2. A disperse dye as claimed in claim 1 wherein R' and R" are methyl, 2-chloroethyl, 2-methoxyethyl, 3-methoxypropyl, 3-ethoxypropyl or 2-cyanoethyl, and wherein R' and R" are identical or different.

3. A mixture of disperse dyes $a$, $b$ and $c$ in the ratio $a:b:c$ of 1:2:1, each dye having the formula

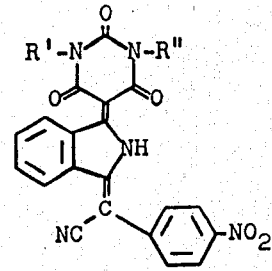

in which in dye $a$ R' and R" are —$CH_3$; in dye $b$ R' is methyl and R" is 3-ethoxypropyl; and in dye $c$ R' and R" are 3-ethoxypropyl.

* * * * *